United States Patent [19]

Obitsu et al.

[11] Patent Number: 4,559,241
[45] Date of Patent: Dec. 17, 1985

[54] METHOD FOR PREVENTING HARDENED CEMENTITIOUS MATERIAL FROM DETERIORATING

[75] Inventors: Masamichi Obitsu; Takahiro Hori, both of Funabashi, Japan

[73] Assignee: Nissan Chemical Industries, Ltd., Tokyo, Japan

[21] Appl. No.: 668,237

[22] Filed: Nov. 5, 1984

[30] Foreign Application Priority Data

Nov. 11, 1983 [JP] Japan .................................. 58-212953

[51] Int. Cl.$^4$ .......................... B32B 35/00; B05D 3/02
[52] U.S. Cl. ..................................... 427/140; 427/142; 427/386; 427/385.5; 427/393.6; 427/403; 427/407.1; 427/409
[58] Field of Search ............... 427/140, 142, 403, 386, 427/407.1, 409, 385.5, 393.6

[56] References Cited

U.S. PATENT DOCUMENTS 4,443,496  4/1984  Obitsu et al. ........................ 427/140

Primary Examiner—Thurman K. Page
Attorney, Agent, or Firm—Jordan and Hamburg

[57] ABSTRACT

An aqueous solution of 1–30 weight % alkali metal silicate and 0.005–10 weight % nitrite is stable and well permeable into hardened cementitious material. When applying said aqueous solution on the surface of hardened cementitious structure having metallic armatures embedded therein, it is possible not only to form surface layer improved in compactness, strength, hardness, waterproofing and weathering for preventing deterioration thereof and repair deteriorated cementitious material but also to prevent said metallic armatures from rusting.

13 Claims, No Drawings

METHOD FOR PREVENTING HARDENED CEMENTITIOUS MATERIAL FROM DETERIORATING

FIELD OF THE INVENTION

This invention relates generally to a method for preventing hardened cementitious material from deteriorating and concurrently preventing metallic armatures embedded therein from rusting and for repairing such cementitious structure already deteriorated, and more particularly to such method of applying an aqueous solution of a particular composition, said solution being improved in storage stability and permeability in said cementitious material.

BACKGROUND OF THE INVENTION

Cured cement, mortar or concrete structure embedded with metallic armatures such as iron or steel wires, rods and frames or metallic structure covered with cement, mortar or concrete to be cured has widely been used in the civil engineering and construction fields. Such cement, mortar and concrete material shall be called hereafter "cementitious material". And such structure shall be called hereafter "cementitious structure".

As well known, such cementitious material is deteriorated from the outer surface to the inner portion gradually with the lapse of years. Due to water and oxygen in air penetrated through pores and cracks of the cementitious material, the metallic armatures are to be rusted by and by which in turn accelerates deterioration of cementitious material. This vicious cycle rapidly weakens the cementitious structure as a whole to be in dangerous state.

Japanese Unexamined Patent Application Gazette No. 78764/1980 discloses a method for repairing such deteriorated of cementitious material by applying an aqueous solution of an alkali metal silicate on the surface thereof and further coating with cement paste so as to prevent exudation thereof. This method intends to prevent neutralization or deterioration of the repaired cementitious material owing to strong alkalinity of such silicate, but since such paste coating is to be cracked before long, since porous and cracked surface portion of the cementitious material itself is not improved thereby and since such alkaline silicate is to be exuded in due course of time, this method can not attain the purpose for a long term prevention of the cementitious material from deterioration.

Japanese Unexamined Patent Application Gazette No. 2639/1976 discloses a method for preventing metal armatures embedded in cementitious material from rusting by applying a liquid agent comprising a nitrite and silica sol at the surface of said cementitious structure to be penetrated therein. This is however, unsatisfactory in that such liquid agent is not of good storage stability and cannot sufficiently penetrated in cementitious material due to colloidal particle size of silica.

Japanese Unexamined Patent Application Gazette No. 20768/1983 discloses a method for improving surface layer of cementitious material by applying an aqueous solution of an alkali metal silicate as well as a condensate of sodium naphtalenesulfonate and formaldehyde. This method is fairly effective for preventing deterioration of cementitious material owing to that such liquid agent can penetrate in such material deeper than any agent of the prior arts to be made compact.

Said method is, however, still unsatisfactory in that water and oxygen in air penetrated in said material, which can not be completely prevented, cause rust of metallic armatures embedded therein, which in turn causes deterioration of cementitious material.

BRIEF EXPLANATION OF THE INVENTION

An object of the invention is, thus, to provide a method for more effectively preventing cementitious material from deteriorating and concurrently metallic armatures embedded therein from rusting so as to cut off the vicious circle of said deterioration and rusting, and for reparing cementitious structure of deteriorated cementitious material and rusted metallic armatures, by applying a liquid composition which is of satisfactory storage stability and can penetrate further deeper in said material.

Said object can be attained according to the invention fundamentally by applying on the outer surface of the cementitious structure of an aqueous solution of an alkali metal silicate in the amount of 1-30, and more preferably 5-20 weight % and a nitrite in the amount of 0.005-10, and more preferably 0.01-5 weight % to be impregnated and by drying, or by removing a portion of cementitious material deteriorated and soiled with exuding rust to expose a rusted portion of metallic armatures, removing rust therefrom, and after drying filling up a recess formed by said cementitious material removal with a new cementitious material.

DETAILED EXPLANATION OF THE INVENTION

As the alkali metal silicate to be used in the invention, the water soluble silicates of lithium, sodium and kalium may be exemplified. Such silicates may be readily available as the respective water glass having $SiO_2/M_2O$ molar ratio of 1-4 in which M represents such alkali metal as marketed popular industrial chemicals. Single silicate or a mixture of silicates is used to be diluted with water. Lithium silicate having $SiO_2/Li_2O$ molar ratio of 2.2-4.0 is most preferable in view of that said silicate can most effectively improve the cementitious material to be compact when used together with a nitrite respectively in the amount of the specified range, and causes almost no efflorescense. It is more preferable to use transparent lithium water glass prepared according to the processes disclosed in Japanese Examined Patent Application Gazette No. 20480/1979.

As the nitrite to be used in the invention together with said alkali metal silicate, the water soluble nitrites of ammonium, lithium, kalium, sodium, calcium and magnesium are exemplified. Such are also readily available as marketed popular industrial chemicals. It is generally preferable to use the nitrite of the same metal as that of the silicate to be used together.

The amounts of the silicate and the nitrite to be dissolved in water are not so critical, but are to be in the range of 1-30, and more preferably 5-20 weight % and 0.005-10, and more particularly 0.01-5 weight % respectively in the aqueous solution to be used according to the invention. When the amount of the alkali metal silicate to be used exceeds the upper limit of 30 weight %, the viscosity of the aqueous solution is too high to be penetrated in the cementitious material to a satisfactory depth, but when said amount is less than the lower limit of 1 weight %, the object of the invention can not be practically attained. When the amount of nitrite to be used is less than the lower limit of 0.005 weight % the object of the invention cannot practically be attained, but when said amount is more than the upper limit of 10 weight % the stability of the aqueous solution is to be adversely lowered.

The aqueous solution used in the invention may be mixed with some other additives in the respectively limited amount so as not to adversely affect thereon. As such additives, formaldehyde condensate with naphthalenesulfonate and a lower aliphatic alcohol such as methanol, ethanol and isopropanol are exemplified. When any of said additives is added to said aqueous solution in the amount of 0.05–1 weight %, the liquid agent is stable and can be penetrated a little deeper in cementitious material. Furthermore aqueous emulsion of some synthetic resins and synthetic rubbers is preferably added in the amount of 1–30, and more preferably 1–10 weight %. When such liquid agent is applied on the outer surface of cementitious structure to be impregnated and then dried, not only adhesiveness of various finish coating agent on the treated surface is improved but also the surface layer of cementitious material is made compact and water-proofing thereof is improved. As material forming such emulsion, vinyl acetate resin, acrylic resin, styrene-butadien rubber, acrylonitrile-butadiene rubber and natural rubber latex are enumerated.

Liquid agent to be used in the invention, which is added as occasion demands with one or more of said additives may be applied on the cementitious structure surface by coating with brush, spraying and any other means usually used in this field. The liquid agent applied is penetrated deeper in the cementitious material and the alkali metal silicate contained therein together with the nitrite may form further improved surface layer in comparison with the agent not containing the nitrite or of the prior arts.

Hitherto, the nitrite has often been mixed with uncured cementitious material in order to prevent rusting of metallic armatures. However, the nitrite distributed uniformly in the cementitious material is too thin to effectively attain the purpose and that the nitrite is gradually exuded.

On the contrary, the nitrite impregnated together with the silicate, according to the invention, is contained only in the improved surface layer and not exuded out therefrom, so that the nitrite together with the silicate prevents much more effectively metallic armatures from rusting.

When the cementitious material has been deteriorated, in general the inner metallic armatures are rusted and rust is often exuded to appear on the surface of the cementitious structure. In order to repair such cementitious structure, a portion of the cementitious material at such stained part is removed off to expose the rusted armatures, applying the liquid agent referred to above on the surface of the cavity formed by said material removal, after removing rust from metallic armatures and then after drying, said cavity is filled up with a new cementitious material of the similar composition. If necessary, finish coating agent is applied on the repaired spot or over the entire surface of the cementitious structure.

The portion applied with the liquid agent of the invention is so improved that new cementitious material or finish coating agent is well adhered thereon as mentioned above. The finish coating agent comprising water and cement or mortar is preferably added with an emulsion of vinyl acetate resin, ethylene-acetic vinyl copolymer resin, acrylic resin, epoxy resin, styrene-butadiene latex, acrylonitrile-butadiene latex, natural rubber latex paraffin oil, asphalt resin and so on in order to avoid cracking of the coating layer.

Hereafter the invention shall be explained further in detail in reference to examples and comparison experiments.

EXAMPLE 1

A steel bar of 9 mm diameter, 100 mm length was covered with mortar consisting of cement, standard sand produced in Toyoura and water in the weight ratio of 1:3:0.75 to be of 5 mm thickness and the opposite ends of said bar was coated with epoxy resin. The cementitious structure miniature cured for four weeks in water was forcedly neutralized in carbonic acid gas to prepare a test sample according to the standard method. Said cementitious structure was dipped in an aqueous solution of 10 weight % sodium silicate of $SiO_2/Na_2O$ molar ratio of 3.0 and 0.1 weight % sodium nitrite for ten minutes and taken out to dry at the room temperature to provide the test sample treated by the invention.

The sample was broken and phenolphthalein as color indicator was poured on the broken surface of the cementitious material. The colored portion depth was measured to be of 3 mm which corresponds to penetration depth of said aqueous solution into the cementitious material.

A similar sample treated by the method of the invention was left to stand in an atmosphere of above 95% relative humidity at a temperature of 50° C. for fifty days. The cementitious material was completely removed and the rusted steel bar was well washed with hydrochloric acid containing inhibitor and dried. The weight of said bar was decreased by only 87 mg.

COMPARISON EXPERIMENT 1

Instead of the aqueous solution in Example 1, an aqueous solution containing no sodium nitrite was prepared to repeat the test according to Example 1. The penetration depth of the aqueous solution of sodium silicate was 3 mm but the weight decrease was 753 mg.

EXAMPLES 2–6 AND COMPARISON EXPERIMENTS 2–4

The tests similar to that in Example 1 were repeated except only composition of the aqueous solution varied as shown in following Table 1 to obtain the results also shown therein, provided that penetration depth measurement was made before drying of the samples to directly determine the depth of the portion wetted with the aqueous solution in comparison Experiments 3 and 4.

As seen from the results shown in Table 1, the decrease of the steel bar weight in said Examples is considerably less than that in comparison Experiments.

It is also learned that applying of the aqueous solution added with a condensate of sodium naphthalene-sulphonate or ethanol may increase penetration depth and decrease steel bar weight loss more or less. Addition of resin emulsion to the aqueous solution also shows a contribution to prevent the steel bar weight decrease.

TABLE 1

| | Aqueous Solution | | | | | | | Penetration Depth (mm) | Steel Bar Weight Loss (mg) |
|---|---|---|---|---|---|---|---|---|---|
| | Silicate | | | Nitrite | | Additive | | | |
| | Sort | Mol. Ratio | Conc. (%) | Sort | Conc. (%) | Sort | Conc. (%) | | |
| | | | | Examples | | | | | |
| 1 | Sodium Sil. | 3.0 | 10 | Sodium Nitr. | 0.1 | — | — | 3 | 87 |
| 2 | Sodium Sil. | 3.0 | 10 | Calcium Nitr. | 0.1 | — | — | 3 | 76 |
| 3 | Lithium Sil. | 3.5 | 10 | Calcium Nitr. | 0.1 | *NSF | 0.1 | 4 | 53 |
| 4 | Kalium Sil. | 3.0 | 10 | Ammonium Nitr. | 0.1 | — | — | 3 | 66 |
| 5 | Lithium Sil. | 3.5 | 10 | Sodium Nitr. | 0.1 | **AS | 10 | 3 | 32 |
| 6 | Lithium Sil. | 3.5 | 10 | Lithium Nitr. | 0.1 | Ethanol | 0.5 | 5 | 21 |
| | | | | Comparison Experiments | | | | | |
| 1 | Sodium Sil. | 3.0 | 10 | — | — | — | — | 3 | 753 |
| 2 | Lithium Sil. | 3.5 | 10 | — | — | — | — | 4 | 255 |
| 3 | — | — | — | Sodium Nitr. | 1 | — | — | 3 | 480 |
| 4 | — | — | — | Calcium Nitr. | 1 | — | — | 3 | 476 |

*NSF represents a comdensate of sodium naphthalenesulfonate with formaldehyde
**As represents an aqueous emulsion of 46% acrylic ester-styrene copolymer

EXAMPLE 7

On the dried test sample similarly prepared as in Example 1, mortar consisting of cement, standard sand produced in Toyoura and water of weight ratio of 1:2:0.6 was applied as finish coating agent by 2 mm thickness to be cured in the natural atmosphere at the room temperature for 28 days.

Decrease of the steel bar weight was 16 mg as a result of measurement as in Example 1.

COMPARISON EXPERIMENT 5

On the dried test sample similarly prepared as in Comparison Experiment 1, finish coating mortar was applied as in Example 7. Decrease of the steel bar weight was 712 mg.

EXAMPLE 8

A test sample was prepared as in Example 1 except only that an aqueous solution of 10 weight % lithium silicate of $SiO_2/Li_2O$ molar ratio of 3.5 and 0.1 weight % sodium nitrite added with 0.5 weight % ethanol was used. On the test sample prepared by the invention, a finish coating agent comprising 20 weight % aqueous emulsion of 45% acrylic resin, 40 weight % water and 350 weight % mortar of cement and standard sand produced in Toyoura in the weight ratio of 1:3 was applied by 2 mm thickness to be cured in the natural atmosphere at the room temperature for 21 days. The obtained sample was measured as in Example 1 to determine decrease of the steel bar weight to be 15 mg.

EXAMPLE 9

A test sample was prepared as in Example 1 except that an aqueous solution of 10 weight % of lithium silicate of $SiO_2/Li_2O$ molar ratio of 3.5 and 0.1 weight % lithium nitrite, added with emulsion of 5% styrene-butadiene rubber latex was used, which was coated with acrylic resin emulsion in the amount of 300 g/m², and dried in the natural atmosphere at the room temperature for 7 days. The sample was measured as in Example 1 to determine decrease of the steel bar weight to be 12 mg.

The results of Comparison Experiment 5 and Examples 7-9 show that even if the finish coating agent is applied when the aqueous solution containing no nitrite, the steel bar weight loss can not be prevented and that when the aqueous solution is applied according to the invention and further said finish coating agent is applied the steel bar weight loss may be decreased.

EXAMPLE 10

Ferro-concrete structure without any finish coating and having cracks considered to have been caused by the inner rusted iron bar due to the lapse of 10 years of using outdoor was used for this Example. On the outer surface of this cementitious structure an aqueous solution of 10 weight % lithium silicate of molar ratio 3.5 and 0.2 weight % lithium nitrite, added with 10% acrylic resin in a form of aqueous emulsion was applied by spraying in the amount of 400 g/m². Finish coating agent comprising 100 weight parts of a mixture having cement and sand in a ratio of 1:3, 40 weit parts of water and 20 weight parts of aqueous emulsion of 46% acrylic resin was applied on the treated surface in 2 mm thickness 3 days after. Since then observation was continued for one year to recognize no symptom of deterioration and rusting. Bonding strength of the finish coating agent on the cementitious material treated according to the invention was measured by the usual method to show 28.5 kg/cm².

COMPARISON EXPERIMENT 6

The test as in Example 10 except only that an aqueous solution of sodium silicate instead of lithium silicate and containing no nitrite was used was carried out on the same cementitious structure. After the lapse of about 6 months, exudation of rust onto the finish coating was observed and after about one year partial fall of not only the finish coating layer but also the cementitious material was observed which was considered to have been caused mainly by rusting of the iron bars embedded therein.

What is claimed is:

1. Method for preventing cementitious material from deteriorating and concurrently metallic armatures embedded therein from rusting, comprising applying an aqueous solution of 5-20 weight % of a lithium silicate having a $SiO_2/Li_2O$ molar ratio of 2.2-4 and 0.01-5 weight % of lithium nitrite on the outer surface of said cementitious material, impregnating the outer surface layer of said cementitious material with said solution, and then drying said solution.

2. Method as claimed in claim 1 comprising adding to said solution an additive selected from the group consisting of a condensate of naphthalenesulfonate with formaldehyde and a lower aliphatic alcohol, said additive being in the amount of 0.05-1 weight %.

3. Method as claimed in claim 2, wherein said lower aliphatic alcohol is selected from the group consisting of methanol, ethanol and isopropanol.

4. Method as claimed in claim 1 comprising adding to said solution an aqueous emulsion selected from the group consisting of synthetic resin and rubber in the amount of 1–30 weight % as solid content.

5. Method as claimed in claim 4, wherein said emulsion is an acrylic resin emulsion.

6. Method as claimed in claim 4, wherein said emulsion is selected from the group consisting of vinyl acetate resin, acrylic resin, styrene-butadiene rubber, acrylonitrile-butadiene rubber and natural rubber emulsions, and mixtures thereof.

7. Method as claimed in claim 1 further comprising applying a finish coating agent to said cementitious material comprising a material selected from the group consisting of a cementitious material and an aqueous emulsion selected from the group consisting of vinyl acetate resin, ethylene vinyl acetate copolyer resin, acrylic resin, epoxy resin, styrene-butadiene rubber, acrylonitrile-butadiene rubber, chloroprene rubber, natural rubber latex, paraffin oil, asphalt resin and mixtures thereof, and mixtures of said cementitious material and said emulsion.

8. Method for repairing cementitious structure of deteriorated cementitious material and rusted metallic armatures, comprising removing a portion of the deteriorated cementitious material at a range where rust is exuded out on the surface thereof to expose the metallic armatures, removing rust therefrom, applying an aqueous solution of 5–20 weight % of a lithium silicate having a $SiO_2/Li_2O$ molar ratio of 2.2–4, and 0.01–5 weight % of lithium nitrite on the surface of the cavity formed by said cementitious material removal and on the peripheral portion thereof, impregnating said surface with said solution, drying said solution, and filling said cavity with a new cementitious material.

9. Method as claimed in claim 8 further comprising applying a finishing coating agent to said new cementitious material.

10. Method as claimed in claim 8 further comprising adding to said solution an additive selected from the group consisting of a condensate of naphthalenesulfonate with formaldehyde and a lower aliphatic alcohol, said additive being in the amount of 0.05–1 weight %.

11. Method as claimed in claim 10, wherein said lower aliphatic alcohol is selected from the group consisting of methanol, ethanol and isopropanol.

12. Method as claimed in claim 8 further comprising adding to said aqueous solution an aqueous emulsion selected from the group consisting of vinyl acetate resin, acrylic resin, styrene-butadiene rubber, acrylonitrile-butadiene rubber and natural rubber emulsions as well as mixtures thereof, in the amount of 1–30 weight % as solid content.

13. Method as claimed in claim 8 further comprising applying a finish coating agent comprising a material selected from the group consisting of a cementitious material and an aqueous emulsion selected from the group consisting of vinyl acetate resin, ethylene-vinyl acetate copolymer resin, acrylic resin, epoxy resin, styrene-butadiene rubber, acrylonitrile-butadiene rubber, chloroprene rubber, natural rubber latex, paraffin oil, asphalt resin and mixtures thereof, and mixtures of said cementitious material and said emulsion.

* * * * *